US012335108B2

(12) United States Patent
Mohankumar et al.

(10) Patent No.: US 12,335,108 B2
(45) Date of Patent: Jun. 17, 2025

(54) SYSTEMS AND METHODS FOR LEVERAGING EMBEDDED SERVICES

(71) Applicant: PAYPAL, INC., San Jose, CA (US)

(72) Inventors: Padmapriya Mohankumar, Chennai (IN); Vishal Kumar Singh, Howrah (IN); Ashraf Kamal, New Delhi (IN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/219,352

(22) Filed: Jul. 7, 2023

(65) Prior Publication Data

US 2025/0016064 A1 Jan. 9, 2025

(51) Int. Cl.
*H04L 41/16* (2022.01)

(52) U.S. Cl.
CPC ..................... *H04L 41/16* (2013.01)

(58) Field of Classification Search
CPC ....................................................... H04L 41/16
See application file for complete search history.

(56) References Cited

U.S. PATENT DOCUMENTS

| 7,788,208 | B2 | 8/2010 | Kobayashi | |
|---|---|---|---|---|
| 9,946,921 | B2 | 4/2018 | Tani | |
| 10,949,252 | B1* | 3/2021 | Krishnamurthy | ..... G06F 9/4881 |
| 2007/0233631 | A1 | 10/2007 | Kobayashi | |
| 2011/0087648 | A1 | 4/2011 | Wang | |
| 2016/0078286 | A1 | 3/2016 | Tani | |
| 2021/0304063 | A1* | 9/2021 | Bulut | ........................ G06N 5/04 |
| 2021/0406782 | A1 | 12/2021 | Nakayama | |
| 2021/0409430 | A1* | 12/2021 | Alford | .................. H04L 67/133 |
| 2022/0067287 | A1 | 3/2022 | Cobb | |
| 2022/0103985 | A1* | 3/2022 | Khasnabish | ............ H04W 4/50 |
| 2022/0383197 | A1 | 12/2022 | Park | |
| 2022/0414462 | A1 | 12/2022 | Guo | |

(Continued)

FOREIGN PATENT DOCUMENTS

WO    2022013879 A1    1/2022

OTHER PUBLICATIONS

Non-final Office Action from U.S. Appl. No. 18/219,308, dated Jun. 5, 2024, 23 pp.

(Continued)

*Primary Examiner* — Adnan M Mirza
(74) *Attorney, Agent, or Firm* — Greenberg Traurig, LLP

(57) ABSTRACT

A method according to the present disclosure may include providing an embedded service in an application, in response to receiving an input via the embedded service, determining an applicable module of a plurality of modules based on a characteristic of at least one of the input or of the embedded service, processing the input via the applicable module, and controlling the application based on the processed input. Another method according to the present disclosure may include providing an embedded service in an application, training a monitoring model via federated learning based on data derived locally from the application, monitoring, via the trained monitoring model, a plurality of interactions with the embedded service, determining, by the trained monitoring model, that at least one of the plurality of interactions comprises an anomalous interaction, and in response to the determination, restricting further usage of the application.

13 Claims, 6 Drawing Sheets

(56) References Cited

U.S. PATENT DOCUMENTS

| | | |
|---|---|---|
| 2022/0414464 A1 | 12/2022 | Krishnaswamy |
| 2023/0012220 A1 | 1/2023 | Humphrey |
| 2023/0050708 A1 | 2/2023 | Watanabe |
| 2023/0083116 A1 | 3/2023 | Liu |
| 2023/0316090 A1 | 10/2023 | Avijit |
| 2023/0319646 A1* | 10/2023 | Estevez ............ H04W 28/0268 |

OTHER PUBLICATIONS

Final Office Action from U.S. Appl. No. 18/219,308, dated Nov. 21, 2024, 22 pp.

* cited by examiner

SYSTEMS AND METHODS FOR LEVERAGING EMBEDDED SERVICES

TECHNICAL FIELD

The instant disclosure relates to leveraging services embedded in an application.

BACKGROUND

Embedded services refer to secondary or add-on services or exchanges that are offered as part of a user's interaction with a primary application. For example, an option to chat with an agent while browsing a web-site would be considered an embedded service.

DETAILED DESCRIPTION

Generally, embedded services function to enhance a user's experience in an application by providing an additional good or service that would go along or synchronize with the user's underlying purpose for the application. However, these embedded services are often generalized and may not be relevant to the particular user. For example, one embedded service may be a chat-bot that prompts a user to connect with an agent after the user has been on an application for a pre-set amount of time. In this example, the chat-bot may activate (e.g., issue the prompt) without regard to the user's inputs on the application, and may be triggered simply by the passage of time.

Accordingly, current embedded services fail to utilize the dynamic potential afforded them by virtue of being embedded or contained within a larger application. In particular, current embedded services—by virtue of being static—may not adequately provide a tailored experience that builds on the user's interactions with the underlying application by leveraging these interactions into providing an embedded service relevant to the user.

The systems and methods described herein provide a solution to this deficiency by maintaining a central collection of embedded modules that provide one or more embedded services. By first analyzing a user's interactions with the underlying application, a system according to the present disclosure may select at least one embedded module that the system determines to be relevant to the user's interactions. As part of this determination, the system may utilize a machine learning model trained using interactions of previous users with the same application or with the same embedded service. This training may also involve federated learning, which would leverage the nature of embedded services as being hosted on a particular application or device by training the larger model via training local models, thereby preserving a user's data.

Figure 1:
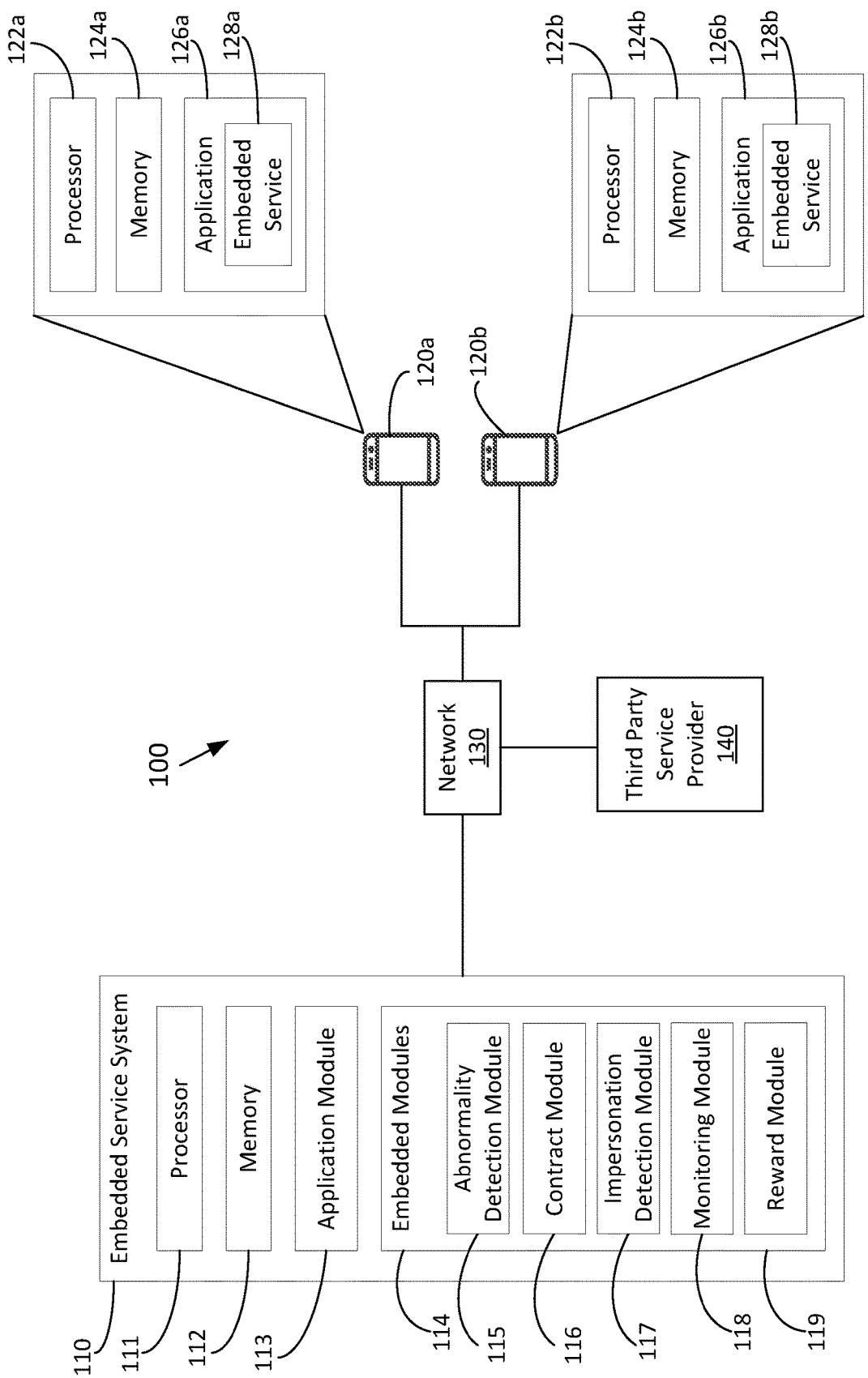
FIG. 1 is a block diagram of an example system for leveraging embedded services.

Referring to the drawings, wherein like reference numerals refer to the same or similar features in the various views, FIG. 1 is a block diagram of an example system 100 for leveraging embedded services. The system 100 may include an embedded service system 110, a first user device 120a, a second user device 120b (collectively "user devices 120" or individually a "user device 120"), and a third party service provider 140. Each of the embedded services system 110, the user devices 120, and the third party service provider may be in electronic communication with one another and/or with other components via a network 130. The network 130 may include any suitable connection (or combinations of connections) for transmitting data to and from each of the components of the system, and may include one or more communication protocols that dictate and control the exchange of data.

As shown, the embedded services system 110 may include one or more functional modules 113 and 114 embodied in hardware and/or software. In an embodiment, the functional modules 113 and 114 of the embedded service system 110 may be embodied in a processor 111 and a memory 112 (i.e., a non-transitory, computer-readable medium) storing instructions that, when executed by the processor 111, cause the embedded services system 110 to perform the functionality of one or more of the functional modules 113 and 114 and/or other functionality of this disclosure. For example, the embedded services system 110 may determine an applicable embedded module 114 based on interactions with the user devices 120, and may generate a graphical user interface (GUI) associated with the embedded module 114.

Each of the user devices 120 may include a processor 122 and a memory 124, which may be any suitable processor and memory. In particular, the user devices 120 may be mobile devices (e.g., smartphones, tablets, laptops, etc.) and/or immobile devices (e.g., kiosk, fixed computer, etc.). The memory 124 may store instructions that, when executed by the processor 122, cause an application 126 to run on the user device 120. This application 126 may include or rely upon one of the embedded modules of the embedded service system 110 (e.g., an application module 113) or may be provided, in part, by the third party service provider 140. The application 126 may also include an embedded service 128, which may be provided by the same party providing the application, or may be provided by a separate and unrelated provider. For example, the embedded service 128 may be a chat-bot operated by the application 126 providers, or the embedded service 128 may be an insurance broker offering coverage over a good sold on the application 126.

The application 126 may be any suitable computer- and/or mobile-based program and set of instructions that, when executed, cause the hosting device (e.g., the user devices 120) to perform a set of operations. For example, the application 126 may be a word processing program, a data management program, a web browser, etc. As part of interactions with the application 126, data may be generated (e.g., interaction histories, text-based documents, data spreadsheets, etc.) and communicated with the embedded services system 110.

The functional modules 113 and 114 of the embedded services system 110 may include an application module 113 configured to determine information regarding an application 126 being run on the user device 120 and to provide that information to the embedded modules 114. In some embodiments, the application module 113 is configured to generate instructions for or otherwise provide the application 126 on the user device 120. In other embodiments, the application module 113 may determine the application 126 being run on the user device 120 if the application module 113 itself is not providing the application. In both embodiments, the application module 113 may generate and/or provide information relating to a content of the application 126 as well as to interactions by the user device 120 with the application 126.

The functional modules 114 and 118 of the event system 110 may include embedded modules 114, which may themselves include an abnormality detection module 115, a contract module 116, an impersonation detection module 117, a monitoring module 118, and a reward module 119. Each of the embedded modules 114 may be configured to provide a service that supplements, coincides with, or augments the application 126.

The abnormality detection module 115 may be configured to determine that a user's (or a user device's 120) interactions with the application 126 are abnormal. Abnormality may refer to fraudulent actions, such as misrepresenting actions for an insurance claim, misrepresenting information for a loan, or other similar misrepresentations that may indicate an attempt by the user to defraud a good or service offered through the application 126. By first establishing a pattern of behavior of a user on the user device 120, the abnormality detection module 115 may then compare a user's action to that established pattern. The abnormality detection module 115 may utilize credit data, cognitive data, sentiment data, affective data, psycholinguistic data, personal data, network data, and/or socio-economic data to establish a user's pattern of behavior.

The abnormality detection module 115 may determine abnormality in parallel with the operations of the underlying application 126, such that the functionality of the abnormality detection module 115 may continuously monitor interactions with the application 126 without altering or otherwise affecting said interactions. The embedded services system 110 may apply the abnormality detection module 115 in response to determining that the user device 120 is interacting with an application 126 that requires the input of information for approval, or requires a similar input that relies upon honestly and correctness from the user (e.g., a situation in which fraud is possible, if not likely).

The contract module 116 may be configured to review a contract presented by the application 126 and to identify one or more critical terms within the contract. In some embodiments, the contract module 116 may identify a term as 'critical' based on a comparison between a previous version of the contract with the current version of the contract, with any term that is substantially different being identified as critical. Whether a term is 'substantially' different may depend on an evaluation by the contract module 116 of the quantity of the change (e.g., how many characters are different, how much text is removed, etc.) as well as of the quality of the change (e.g., how important or central is the term to the contract). In some embodiments, the contract module 116 may identify a term as 'critical' in response to a term greatly favoring one party to the contract over the other. Because many contract terms necessarily favor one party, the contract module 116 may identify terms as 'critical' when those terms substantially favor one party, which the contract module 116 may determine by generating a fairness score and comparing that fairness score to a threshold.

The contract module 116 may include and utilize a machine learning model trained using data derived from contracts to identify critical terms. For example, the machine learning model may be trained using data derived from contracts having a known fairness score, and data derived from contracts having undergone substantial changes. In some embodiments, the contract module 116 may be trained at multiple levels (e.g., groups, complexities, lengths, etc.) of contract terms. In particular, the contract module 116 may be trained at paragraph-level, sentence-level, token-level, word-level, etc. Because the machine learning model may be trained at different levels, the contract module 116 may determine critical terms regardless of length. For example, a specific word of a contract may not by itself be critical (e.g., unfair), but the specific sentence containing the specific word may be critical. Because the contract module 116 may be capable of determining criticality at multiple levels, the contract module 116 may flag this sentence as critical, even though individual words in the sentence may not themselves be critical. The training process for a machine learning model of the contract module 116 is described in greater depth below with regard to FIG. 2.

The impersonation detection module 117 may be configured to determine that a user of the user device may be impersonating another individual. For example, if a user device 120 has a history of browsing college admission websites—actions indicative of a teenager exploring post-graduation options—and then submits paperwork for a loan indicating that the user is elderly, the abnormality detection module 115 may identify the paperwork as fraudulent. Accordingly, the abnormality detection module 115 does so in parallel with the application 126 that may process said paperwork, as well as the application 126 that may provide access to the college admission websites.

The monitoring module 118 may be configured to receive and review data regarding interactions by the user device 120 and may determine an appropriate or relevant embedded module 110 based on the interactions. As part of monitoring interactions on a specific user device 120, the monitoring module 118 may utilize, operate, and/or contribute to a federated learning system that may train a local model (e.g., on a particular user device 120) using data locally stored, and may then train a centralized model based on results from training the local model. For example, the monitoring module 118 may train a model locally by adjusting one or more parameters of said local model, may export those adjusted parameters without any of the underlying training data or identifying information, and may adjust parameters of said central model using the local parameters (without otherwise utilizing training data). The monitoring module 118 may subsequently utilize this central model to monitor interactions and to determine an applicable embedded module 110.

The reward module 119 may be configured to analyze data regarding interactions with the user device 120 (and particularly, the application 126) and to provide a reward or similar prompt based on the analysis. In particular, the reward module 119 may determine a type of incentive or bonus that a user of the user device 120 would particularly appreciate, and that may encourage further use of the application 126 by the user. Like the monitoring module 118, the reward module 119 may utilize a federated learning model in order to make determinations based on a larger dataset than just that data stored locally on the user device 120. Accordingly, the reward module 119 may factor in global reward data when making determinations for a single local user device.

Figure 2:
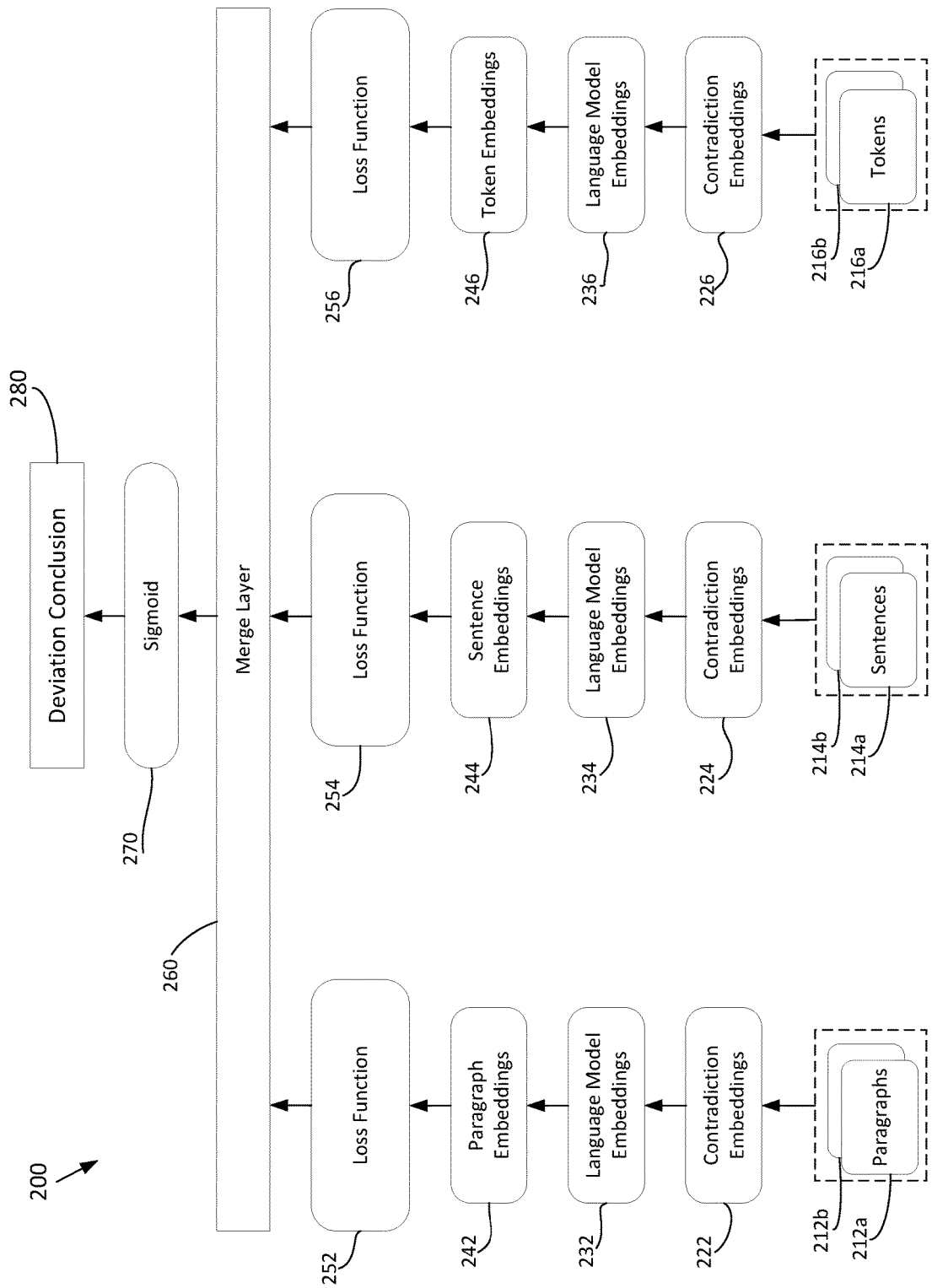
FIG. 2 is a block diagram of an example training process for a model that may be used in the system of FIG. 1.

FIG. 2 is a block diagram of an example machine learning model 200 of the that may be utilized by the contract module 116 to identify one or more critical terms in a received contract by identifying deviations within the received contract. The deviation may be a difference between versions of a contract, or the deviation may be a term that is substantially unfair (e.g., a "deviation" from norms). As described below, the model 200 generally includes three model portions—a paragraph-level portion, a sentence-level portion, and a token-level portion—that recognize contractual deviations in paragraphs, sentences, and tokens, respectively.

The input to the model 200 may include two or more documents. One of the input documents may be a document under consideration, i.e., the document for which deviations are to be considered (in the example of FIG. 2, Document A) having paragraphs 212a, sentences 214a, and tokens 216a. One or more additional input documents may be the basis for deviation determinations, which may be a previous version of Document A or a document including standard or expected terms. In the example of FIG. 2, the one or more additional input documents include Document B having paragraphs 212b, sentences 214b, and tokens 216b.

For each portion of the model, various embeddings of each input document may be determined, and the portion-specific embeddings of the input documents may be compared to one another via a loss function, which loss functions may indicate the degree of deviance of one document from the other(s). In the paragraph-level portion, for each paragraph 212 of each document, a contradiction embeddings 222 and a language model (LM) embeddings 232 may be generated as representative of an amount of contrast within said paragraph 212. In particular, the contradiction embeddings 222 may be representative of a global semantic feature of the respective paragraph 212, and the LM embeddings 232 may be representative of a local semantic feature. Global semantic features may capture the relevancy of word order within the paragraph 212 for contradiction, while local semantic features may capture contradiction between words regardless of order within the paragraph 212. By generating embeddings representative of both semantic features, the process 200 may generate a single embeddings 242 representative of a deviation of the respective paragraph both within context (e.g., global semantic features) and without context (e.g., local semantic features). Accordingly, both the contradiction embeddings 222 and the LM embeddings 232 may be used to generate paragraph embeddings 242 for each respective paragraph 212. These embeddings 242 of each input document are, in turn, input into a loss function 252, with the output of the loss function 252 being input into a merge layer 260. The contradiction embeddings 222 may be generated via a model pre-trained on large corpora at a paragraph-level, and the LM embeddings 232 may be generated by a BERT-NLI language model trained for contradiction and entailment predication at the paragraph-level.

Sentence embeddings 244 and token embeddings 246 may be similarly generated for each input document. In particular, in the sentence-level model portion, sentences 214 of each input document may be used to generate contradiction embeddings 224 and LM embeddings 234, which may be used to generate sentence embeddings 244. In the token-level model portion, tokens 216 (e.g., letters, words, phrases, etc.) of each input document may be used to generate contradiction embeddings 226 and LM embeddings 236, which may be used to generate token embeddings 246. The sentence embeddings 244 and token embeddings 246 may then be input into loss functions 254, 256 respectively, and output from the loss functions 254, 256 may be further input into merge layer 260. The contradiction embeddings 224, 226 may be generated via a model pre-trained on large corpora at a sentence-level and token-level respectively, and the LM embeddings 234, 236 may be generated by a BERT-NLI language model trained for contradiction and entailment predication at the sentence-level and token-level respectively.

Because each of the paragraph embeddings 242, sentence embeddings 244, and token embeddings 246 may be representative of an amount of deviation within a respective amount of a contract, each of the loss functions 252, 254, 256 may be configured to measure an amount of contrastive loss for the representative deviation. The loss functions 252, 254, 256 may be determined, operated, or otherwise executed by a respective neural network. The merge layer 260 may then combine the representative embeddings at each level of contract text for a single embeddings representative of an amount of deviation for a contract (or contract term) at the paragraph-level, sentence-level, and token-level. The output from the merge layer 260 may then be input into a sigmoid function 270 that generates a number between 0 and 1 indicative of the amount of deviation represented by the merge layer 260 output embeddings.

This output value from the sigmoid 270 between 0 and 1 may be utilized by the contract module model 200 to identify a term as critical (e.g., a deviation above a threshold) and, subsequently, determine a corrective action that would address the critical term. The contract module model 200 may determine a term as critical in response to the sigmoid value—which is indicative of an amount of deviation of the respective term—exceeds a threshold value. The threshold value may be pre-determined as representative of an acceptable level of deviation for a contract, and may be associated with a type of underlying contract. For example, if the contract is an agreement between a user and their cellular service provider (e.g., a notoriously unfair contract), the threshold value for unfairness may be higher than for an agreement between two colleagues regarding sharing ownership over a manuscript. In some embodiments, the threshold value may be determined based on (or set by) the application 126 in use.

The contract module model 200 may determine a corrective action based on the determined critical portion (e.g., term, sentence, or paragraph). In some embodiments, the contract module model 200 may determine the corrective action as displaying the determined critical portion, regardless of a content of the critical portion. For example, the contract module model 200 may determine the corrective action as displaying the term both for a term determined to be unfair due to excessive penalties and for a term determined to be different from a previous version. In some embodiments, the contract module model 200 may determine the corrective action from a list of possible corrective actions that are accompanied by a type or content of critical portion, such that the contract module model 200 may determine the corrective action by matching a type or content of the identified critical portion with that of the list.

Figure 3:
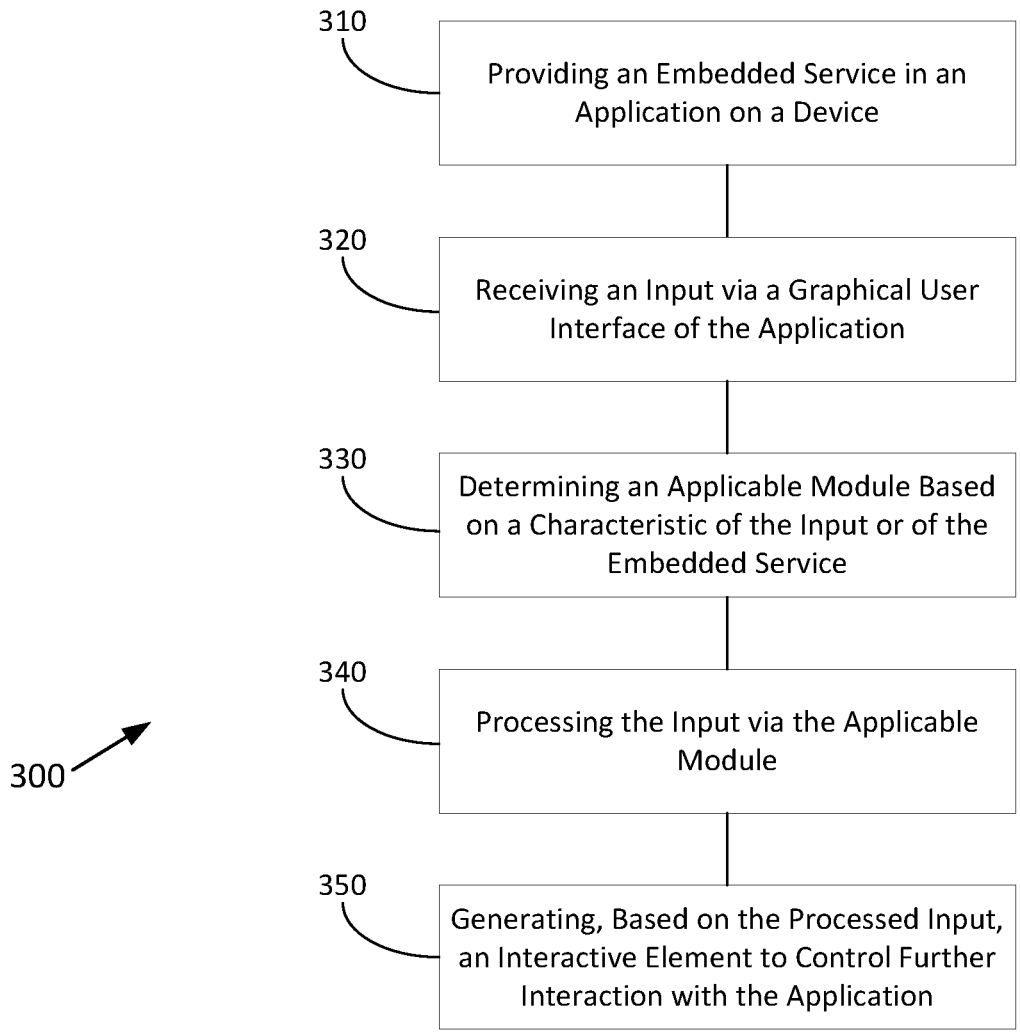
FIG. 3 is a flow chart illustrating an example method of leveraging embedded services.

FIG. 3 is a flow chart illustrating an example method 300 of leveraging an embedded service 128 in an application 126. The method 300, or one or more portions of the method 300, may be performed by system 100 and particularly the embedded services system 110 (shown in FIG. 1), in some embodiments.

The method 300 may include, at block 310, providing an embedded service (e.g., embedded service 128) in an application (e.g., application 126) on a device (e.g., user device 120). The embedded service 128 may originate with a third party service provider 140 that may be, in turn, facilitated by the embedded service system 110. In particular, the embedded service system 110 may select the embedded service 128 from a plurality of embedded services offered by the third party service provider 140. In some embodiments, the embedded service 128 may originate from the embedded services system 110 or, particularly, from one of the embedded modules 114 of the embedded service system 110.

The method 300 may also include, at block 320, receiving a user input via a graphical user interface of the application. The user input may be a user interaction with the application, such as the input of information into the application, selection of an option within the application, or an attempt to initiate or otherwise perform a transaction within the application.

The method 300 may also include, at block 330, determining an applicable module based on one or more of a characteristic of the input, a characteristic of the application, or a characteristic of the embedded service. In particular, an applicable module from one of the embedded modules 114 may be selected based on a content of the input, or of an action selected by the input. For example, if the input indicates a selection of terms for financing, the applicable module may be the abnormality detection module 115 (e.g., to identify fraud in the financing) or the impersonation detection module (e.g., to determine if the user may be impersonating another for financing). In another example, if the input indicates uploading or displaying of a contract, the applicable module may be the contract module 116 (e.g., to identify and remediate any deviations in the contract).

The method 300 may also include, at block 340, processing the input via the applicable module. The embedded service system 110 may process the input by deriving one or more relevant portions from the input (e.g., one or more terms from a contract, one or more pieces of identifying information from a financing application, etc.) and analyzing the derived portions with the applicable module. For example, the embedded service system 110 may process a received contract by inputting terms from the contract into the trained contract module model 200 of the contract module 116.

The method 300 may also include, at block 350, generating, based on the processed input, an interactive element to control further interaction with the application. In those examples in which the processed input is a contract, and a term from the contract is identified as critical, the interactive element may be the corrective action determined by the contract module 116. In those examples in which the processed input is identifying information, and at least one piece of the identifying information is identified as abnormal, the interactive element may be a prompt for additional information, which may prohibit further interaction with the application 126 until satisfied. As such, the embedded service system 110 may disable the user device 120 from accessing the application 126 in response to a detection of fraud.

Figure 4:
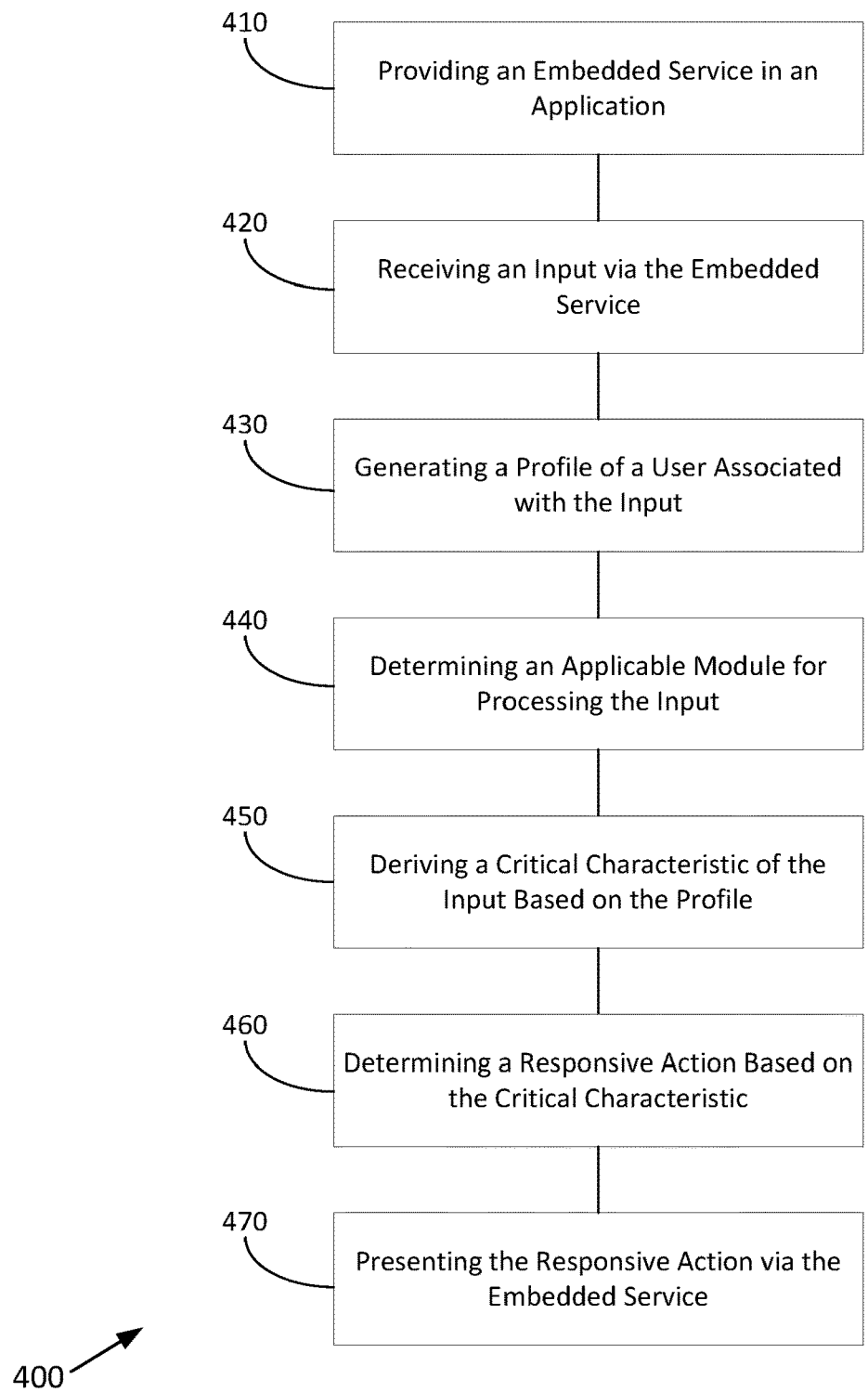
FIG. 4 is a flow chart illustrating an example method of leveraging embedded services.

FIG. 4 is a flow chart illustrating an example method 400 of leveraging an embedded service 128 in an application 126. For example, while the method 300 of FIG. 3 addresses determination of an applicable module based on an input or embedded service and generating an interactive element via the applicable module, the method 400 of FIG. 4 recharacterizes these concepts by additionally describing generation of a user profile based on the input and derivation of a critical characteristic based on the generated profile. Both methods 300, 400 may find use with any embedded service. The method 400, or one or more portions of the method 400, may be performed by system 100 and particularly the embedded services system 110 (shown in FIG. 1), in some embodiments.

The method 400 may include, at block 410, providing an embedded service (e.g., embedded service 128) in an application (e.g., application 126) on a device (e.g., user device 120). The embedded service 128 may originate with a third party service provider 140 that may be, in turn, facilitated by the embedded service system 110. In particular, the embedded service system 110 may select the embedded service 128 from a plurality of embedded services offered by the third party service provider 140. In some embodiments, the embedded service 128 may originate from the embedded services system 110 or, particularly, from one of the embedded modules 114 of the embedded service system 110.

The method 400 may also include, at block 420, receiving an input via a graphical user interface of the application. The input may be an interaction with the application, such as the input of information into the application, selection of an option within the application, or an attempt to transact within the application.

The method 400 may also include, at block 430, generating a profile of a user associated with the input based on the input and on other interactions by the user within a same session. Accordingly, the embedded service system 110 may generate a "zero-trust" profile, in which a user's profile begins or originates from a place of zero-trust, such that the user's actions may be judged without regard to previous approval or authorization. By utilizing a zero-trust approach, the embedded service system 110 may reduce the ability of bad-faith actors to access unauthorized materials by piggybacking on an authorized user, and may also reduce biased assumptions by focusing strictly on security behaviors. Once the initial zero-trust profile is established, the embedded service system 110 may enrich the profile with environmental data (e.g., IP addresses, login records, geo-locations, device information, etc.) and behavioral data (e.g., usage, timings, login frequencies, etc.) derived from the application.

The method 400 may also include, at block 440, determining an applicable module based on a characteristic of the input, of the application, or of the embedded service. In particular, an applicable module from one of the embedded modules 114 may be selected based on a content of the input, or of an action selected by the input. For example, if the input indicates a selection of terms for financing, the applicable module may be the abnormality detection module 115 (e.g., to identify fraud in the financing) or the impersonation detection module (e.g., to determine if the user may be impersonating another for financing). In another example, if the input indicates uploading or displaying of a contract, the applicable module may be the contract module 116 (e.g., to identify and remediate any deviations in the contract).

The method 400 may also include, at block 450, deriving a critical characteristic of the input based on the profile. For example, the embedded service system 110 may process the input by deriving one or more relevant portions from the input (e.g., one or more terms from a contract, one or more pieces of identifying information from a financing application, etc.) and analyzing the derived portions with the applicable module in view of the zero-trust profile. In particular, the impersonation detection module 117 may compare the identifying information to that of the profile established at block 430, and may identify any piece of identifying information that does not match as critical.

The method 400 may also include, at block 460, determining a responsive action based on the identified critical characteristic and, at block 470, presenting the responsive action via the embedded service. In those examples in which the processed input is a contract, and a term from the contract is identified as critical, the responsive action may be the corrective action determined by the contract module 116. In those examples in which the processed input is identifying information, and at least one piece of the identifying information is identified as abnormal, the responsive action may be a prompt for additional information, which may prohibit further interaction with the application 126 until satisfied. As such, the embedded service system 110 may disable the user device 120 from accessing the application 126 in response to a detection of fraud.

Figure 5:
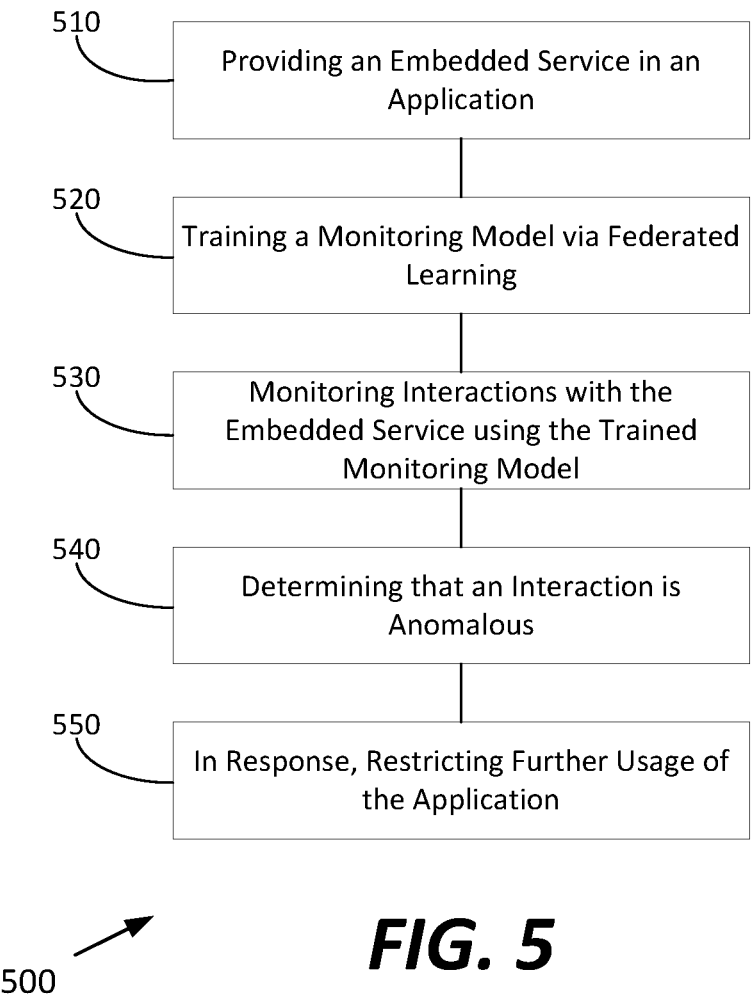
FIG. 5 is a flow chart illustrating an example method of leveraging embedded services.

FIG. 5 is a flow chart illustrating an example method 500 of leveraging an embedded service 128 on an application 126. For example, while the methods 300 of FIG. 3 and 400 of FIG. 4 address determination and application of an applicable module for an input or embedded service, the method 500 of FIG. 5 recharacterizes these concepts by additionally describing training a particularly embedded service via federated learning. Each of methods 300, 400, 500 may find use with any embedded service. The method 500, or one or more portions of the method 500, may be performed by system 100 and particularly the embedded services system 110 (shown in FIG. 1), in some embodiments.

The method 500 may include, at block 510, providing an embedded service (e.g., embedded service 128) in an application (e.g., application 126) on a device (e.g., user device 120). The embedded service 128 may originate with a third party service provider 140 that may be, in turn, facilitated by the embedded service system 110. In particular, the embedded service system 110 may select the embedded service 128 from a plurality of embedded services offered by the third party service provider 140. In some embodiments, the embedded service 128 may originate from the embedded services system 110 or, particularly, from one of the embedded modules 114 of the embedded service system 110.

The method 500 may also include, at block 520, training a monitoring model via federated learning. As previously described, federated learning may include training a local model via training data stored locally, and then training a global or central model based on the trained local model. However, in order to preserve any privacy measures over the local training data, as well as to reduce bandwidth strain on a system, the global model may be trained based on various parameters utilized by the trained local model rather than based on the trained local model in its entirety. Accordingly, the federated learning process (e.g., managed by the monitoring module 118) may export resultant parameters from the locally-trained model to a system managing a global model.

In some embodiments, the embedded service system 110 may utilize federated learning with models that are local to particular embedded services 128 rather than to particular user devices 120. For example, a first model may be trained locally using data from a first embedded service and a second model may be trained locally using data from a second embedded service that is hosted on the same user device as the first embedded service. Accordingly, the resultant globally-trained model may be for the user device 120 as a whole, based on the user's interactions with different embedded services on their single device.

The method 500 may also include, at block 530, monitoring interactions with the embedded service using the trained monitoring model and, at block 540, determining that an interaction is anomalous or abnormal. Because the trained monitoring model may be trained using federated learning, the monitoring model may be trained according to a global dataset based on multiple different models trained on data from multiple different users. Accordingly, the trained monitoring model may effectively capture anomalous behavior through reference to a varied and diverse dataset.

The method 500 may also include, at block 550, restricting further usage of the application in response to the determination of an anomalous interaction. For example, the embedded service system 110 may generate a prompt for additional verifying information that blocks the user device 120 screen from interacting with the application 126 until sufficient additional information is provided by the user. In another example, the embedded service system 110 may provide a prompt to review a term from a contract that is determined to be substantially unfair, and may block the user device 120 screen from proceeding with the contract until the user device 120 confirms that the unfair term is acceptable.

Figure 6:
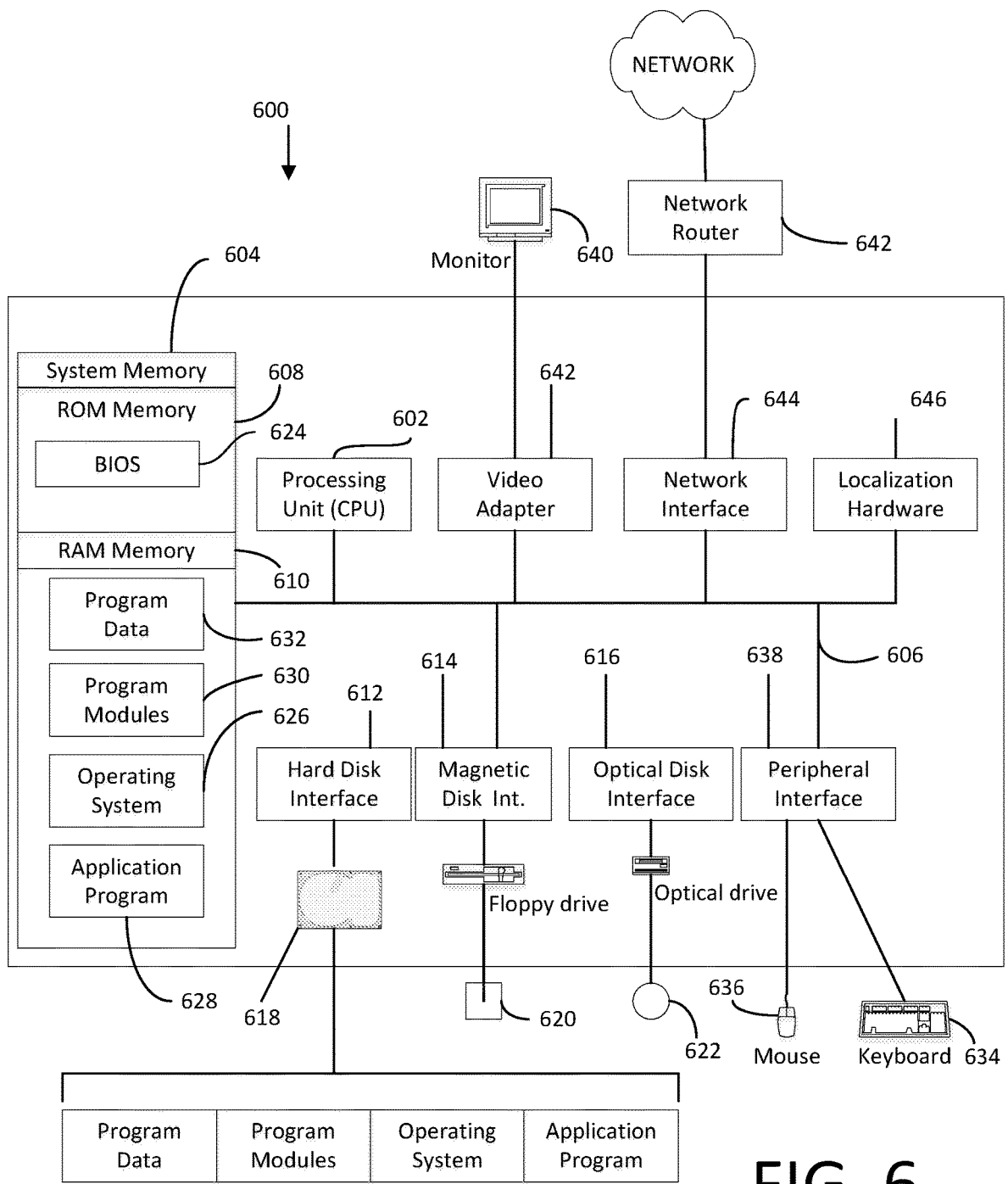
FIG. 6 is a diagrammatic view of an example embodiment of a user computing environment.

FIG. 6 is a diagrammatic view of an example embodiment of a user computing environment that includes a computing system environment 600, such as a desktop computer, laptop, smartphone, tablet, or any other such device having the ability to execute instructions, such as those stored within a non-transient, computer-readable medium. For example, the computing system environment 600 may be the user device 160 or a system hosting the policy system 110. In another example, one or more components of the computing system environment 600, such as one or more CPUs 602, RAM memory 610, network interface 644, and one or more hard disks 618 or other storage devices, such as SSD or other FLASH storage, may be included in the event system 110. Furthermore, while described and illustrated in the context of a single computing system, those skilled in the art will also appreciate that the various tasks described hereinafter may be practiced in a distributed environment having multiple computing systems linked via a local or wide-area network in which the executable instructions may be associated with and/or executed by one or more of multiple computing systems.

In its most basic configuration, computing system environment 600 typically includes at least one processing unit 602 (e.g., processor 162) and at least one memory 604 (e.g., memory 164), which may be linked via a bus. Depending on the exact configuration and type of computing system environment, memory 604 may be volatile (such as RAM 610), non-volatile (such as ROM 608, flash memory, etc.) or some combination of the two. Computing system environment 600 may have additional features and/or functionality. For example, computing system environment 600 may also include additional storage (removable and/or non-removable) including, but not limited to, magnetic or optical disks, tape drives and/or flash drives. Such additional memory devices may be made accessible to the computing system environment 600 by means of, for example, a hard disk drive interface 612, a magnetic disk drive interface 614, and/or an optical disk drive interface 616. As will be understood, these devices, which would be linked to the system bus, respectively, allow for reading from and writing to a hard disk 618, reading from or writing to a removable magnetic disk 620, and/or for reading from or writing to a removable optical disk 622, such as a CD/DVD ROM or other optical media. The drive interfaces and their associated computer-readable media allow for the nonvolatile storage of computer readable instructions, data structures, program modules and other data for the computing system environment 600. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 600.

A number of program modules may be stored in one or more of the memory/media devices. For example, a basic input/output system (BIOS) 624, containing the basic routines that help to transfer information between elements within the computing system environment 600, such as during start-up, may be stored in ROM 608. Similarly, RAM 610, hard disk 618, and/or peripheral memory devices may be used to store computer executable instructions comprising an operating system 626, one or more applications programs 628 (which may include the functionality of the policy system 110 of FIG. 1 or one or more of its functional modules 114 and 118, for example), other program modules 630, and/or program data 632. Still further, computer-executable instructions may be downloaded to the computing environment 600 as needed, for example, via a network connection.

An end-user may enter commands and information into the computing system environment 600 through input devices such as a keyboard 634 and/or a pointing device 636. While not illustrated, other input devices may include a microphone, a joystick, a game pad, a scanner, etc. These and other input devices would typically be connected to the processing unit 602 by means of a peripheral interface 638 which, in turn, would be coupled to bus. Input devices may be directly or indirectly connected to processor 602 via interfaces such as, for example, a parallel port, game port, firewire, or a universal serial bus (USB). To view information from the computing system environment 600, a monitor 640 or other type of display device may also be connected to bus via an interface, such as via video adapter 642. In addition to the monitor 640, the computing system environment 600 may also include other peripheral output devices, not shown, such as speakers and printers.

The computing system environment 600 may also utilize logical connections to one or more computing system environments. Communications between the computing system environment 600 and the remote computing system environment may be exchanged via a further processing device, such a network router 642, that is responsible for network routing. Communications with the network router 642 may be performed via a network interface component 644. Thus, within such a networked environment, e.g., the Internet, World Wide Web, LAN, or other like type of wired or wireless network, it will be appreciated that program modules depicted relative to the computing system environment 600, or portions thereof, may be stored in the memory storage device(s) of the computing system environment 600.

The computing system environment 600 may also include localization hardware 656 for determining a location of the computing system environment 600. In embodiments, the localization hardware 656 may include, for example only, a GPS antenna, an RFID chip or reader, a WiFi antenna, or other computing hardware that may be used to capture or transmit signals that may be used to determine the location of the computing system environment 600.

In some embodiments, a system includes a processor; a centralized data warehouse; and a non-transitory computer readable medium storing thereon instructions that are executable by the processor to cause the system to perform operations including training a machine learning model based on enterprise data from the centralized data warehouse, the machine learning model trained to determine a value corresponding to a metric; receiving, from at least one external source, updated enterprise data; determining, in real-time by the machine learning model, a predicted change to the value based on the updated enterprise data; and presenting, via a graphical user interface (GUI), a suggested action based on the predicted change.

In some of these embodiments, training the machine learning model includes normalizing the enterprise data; determining an effect of each datapoint of the enterprise data on the determined metric value; deriving a linear regression for the machine learning model based on the determined effects; and adjusting the linear regression according to a loss function.

In some of these embodiments, the loss function receives, as input, a predicted value from the trained machine learning model and an override value from a user.

In some of these embodiments, the at least one external source includes a relational database or a streaming application.

In some of these embodiments, the operations further include presenting, on the GUI, an interactable element; determining filtered enterprise data based on an interaction with the interactable element; determining a filtered value for the set of metrics based on the filtered enterprise data; and presenting, on the GUI, at least one of the filtered value or the filtered enterprise data.

In some of these embodiments, the operations further include continuously receiving new data from the centralized data warehouse in response to the centralized data warehouse receiving an update to the enterprise data from the external source.

In some embodiments, a computer-implemented method includes receiving, by a computing system through a graphical user interface (GUI), an initial set of weights corresponding to a set of metrics; receiving, by the computing system from a centralized data warehouse, enterprise data; determining, by the computing system, a value for each metric of the set of metrics for the enterprise data; presenting, by the computing system on the GUI, a weighted value for the set of metrics based on the initial set of weights; receiving, by the computing system through the GUI, an input regarding the weighted value; determining, by the computing system, based on the input, an updated set of weights; retrieving, by the computing system, in real-time from the centralized data warehouse, updated enterprise data; and presenting, by the computing system on the GUI, an updated value for the set of metrics based on the updated enterprise data and the updated set of weights.

In some of these embodiments, the method further includes training, by the computing system, a machine learning model based on the enterprise data; receiving, by the computing system through the GUI, a query associated with a metric of the set of metrics, the query identifying a predicted datapoint; determining, by the computing system via the machine learning model, a predicted value for the metric based on the predicted datapoint; and presenting, by the computing system, the predicted value on the GUI.

In some of these embodiments, training the machine learning model includes normalizing, by the computing system, the enterprise data; determining, by the computing system, an effect of each datapoint of the enterprise data on the weighted value; deriving, by the computing system, a linear regression for the machine learning model based on the determined effects; and adjusting, by the computing system, the linear regression according to a loss function.

In some of these embodiments, the method further includes presenting, by the computing system on the GUI, an interactable element; determining, by the computing system, filtered enterprise data based on an interaction with the interactable element; determining, by the computing system, a filtered value for the set of metrics based on the filtered enterprise data; and presenting, by the computing system on the GUI, at least one of the filtered value or the filtered enterprise data.

In some of these embodiments, the method further includes continuously receiving, by the computing system, new data from the centralized data warehouse in response to the centralized data warehouse receiving an update to the enterprise data from an external source.

In some of these embodiments, the method further includes processing, by the computing system, the update from the external source to conform with a formatting requirement of the centralized data warehouse.

In some of these embodiments, the set of metrics include a set of pre-determined polices for enterprise data.

In some embodiments, a non-transitory computer readable medium stores program instructions that, when executed by a processor, cause a computer system to perform operations including receiving, from at least one database, first enterprise data; receiving, from at least one application, second enterprise data; processing the first and second enterprise data for storage in a centralized data warehouse; in response to receipt of a query identifying a metric, determining a value for the metric based on the processed data in the centralized data warehouse; receiving, from the at least one database or the at least one application, updated enterprise data; and in real-time and in response to the updated enterprise data, updating the determined value.

In some of these embodiments, the at least one database includes at least one relational database external to the computing system, and the at least one application includes a streaming application external to the computing system.

In some of these embodiments, processing the first and second enterprise data includes altering a format of the first and second enterprise data to a format compatible with the centralized data warehouse.

In some of these embodiments, the operations further include deriving, from the processed data, a training set; training a machine learning model using the training set; receiving a query identifying a predicted datapoint; determining, by the machine learning model, a predicted value for the metric based on the predicted datapoint; and presenting the predicted value.

In some of these embodiments, the predicted value is presented on a graphical user interface (GUI).

In some of these embodiments, training the machine learning model includes associating, for the machine learning model, a first datapoint of the training set with an actual first value for the metric, the first value included in the first datapoint; determining, by the machine learning model, a predicted second value for the metric based on a second datapoint of the training set; determining an error for the machine learning model based on a difference between the predicted second value and an actual second value from the second datapoint; and adjusting the machine learning model based on the determined error.

In some of these embodiments, the operations further include continuously refreshing the centralized data warehouse for any update to the enterprise data from the at least one database or the at least one application.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method comprising:
providing an embedded service including a first embedded service and a second embedded service in an application;
training a monitoring model via federated learning based on data derived locally from the application;
monitoring, via the trained monitoring model, a plurality of interactions with the embedded service;

determining, by the trained monitoring model, that at least one of the plurality of interactions comprises an anomalous interaction; and in response to the determination, restricting further usage of the application, wherein the federated learning comprises training a local model based on the data derived locally from the application, and the monitoring model is trained based on results from training the local model, and wherein training the monitoring model via federated learning comprises:

training a first iteration of the monitoring model with a first set of historical interactions;

retrieving a first parameters from the first trained iteration;

training a second iteration of the monitoring model with a second set of historical interactions;

retrieving a second parameters from the second trained iteration; and determining parameters for the trained monitoring model as an average of the first parameters and the second parameters.

2. The method of claim 1, wherein:
training the monitoring model via federated learning comprises:
retrieving the first set of historical interactions with the first embedded service; and retrieving the second set of historical interactions with the second embedded service.

3. The method of claim 1, wherein:
the first embedded service is provided to a first user device,
the second embedded service is provided to a second user device, and
the first user device and the second user device are separate devices operating a same application.

4. The method of claim 1, wherein the first iteration and the second iteration are each trained independently of the other of the first iteration and the second iteration.

5. The method of claim 1, wherein:
the application comprises a first application,
the method further comprises providing the first embedded service in the first application and the second embedded service in a second application, and
training the monitoring model via federated learning comprises:
retrieving the first set of historical interactions with the first embedded service in the first application; and
retrieving the second set of historical interactions with the second embedded service in the second application.

6. The method of claim 5, wherein the first iteration and the second iteration are each trained independently of the other of the first iteration and the second iteration.

7. The method of claim 1, wherein the embedded service comprises a contract review module configured to:
receive a document having a plurality of terms;
process the document to determine a critical term of the plurality of terms; and
present, via the application, an action in response to the critical term.

8. The method of claim 1, further comprising:
processing the data derived locally from the application to determine a pattern of interactions with the embedded service; and
presenting, on the application, a recommend action in the embedded service based on the determined pattern.

9. The method of claim 1, wherein restricting further usage of the application comprises restricting further usage by a particular device.

10. A computer-implemented method comprising:
providing, by a server, an application to a first device and to a second device, the application having an embedded service;
storing, on the first device, a first dataset indicative of interactions with the embedded service by the first device;
storing, on the second device, a second dataset indicative of interactions with the embedded service by the second device;
training, locally on the first device, a first portion of a machine learning model using the first dataset;
training, locally on the second device, a second portion of the machine learning model using the second dataset;
retrieving, by the server from the first device and the second device, respective parameters associated with the trained first portion and the trained second portion, respectively;
adjusting the machine learning model based on the retrieved parameters;
determining, via the adjusted machine learning model, that an interaction with the application comprises an anomaly; and
in response to the determined anomaly, restricting access to the application for a device associated with the determined anomaly,
wherein adjusting the machine learning model based on the retrieved parameters comprises:
determining a shared set of parameters as an average of the parameters associated with the trained first portion and the parameters associated with the trained second portion; and
applying the shared set of parameters to the machine learning model.

11. The method of claim 10, wherein the first portion and the second portion are trained independently of the other of the first portion and the second portion.

12. The method of claim 10, wherein the parameters received from the first device are different from the parameters received from the second device.

13. The method of claim 10, wherein the first portion of the machine learning model is identical to the second portion of the machine learning model before training by the first device and the second device.

* * * * *